F. M. BUDLONG.
COMBINED CENTERING AND FACING TOOL.
APPLICATION FILED APR. 2, 1917.
1,244,953. Patented Oct. 30, 1917.
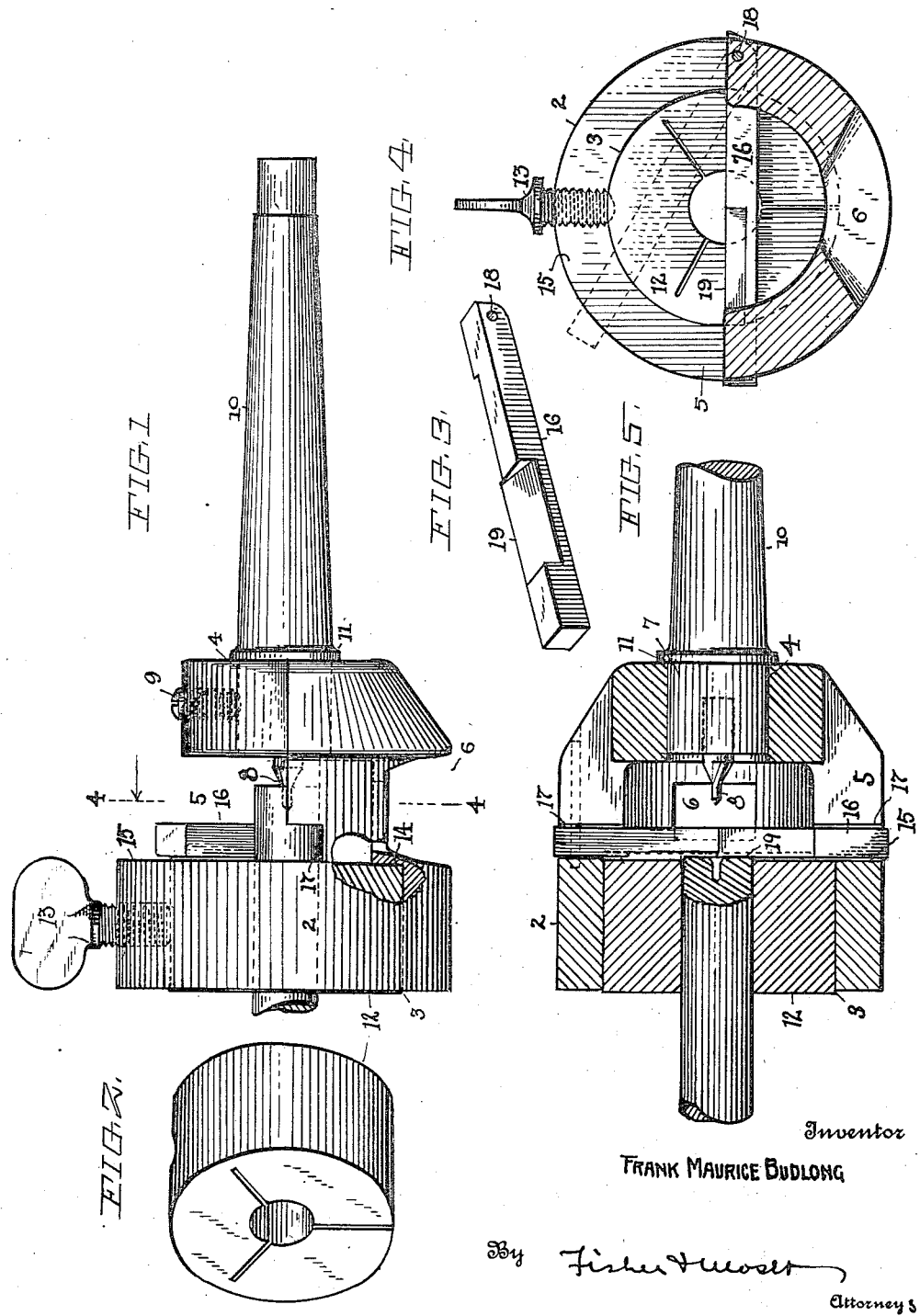
Inventor
FRANK MAURICE BUDLONG

UNITED STATES PATENT OFFICE.

FRANK MAURICE BUDLONG, OF SAN JOSE, CALIFORNIA, ASSIGNOR OF ONE-HALF TO JOHN MOORE CURRAGH, OF SAN JOSE, CALIFORNIA.

COMBINED CENTERING AND FACING TOOL.

1,244,953. Specification of Letters Patent. Patented Oct. 30, 1917.

Application filed April 2, 1917. Serial No. 159,316.

*To all whom it may concern:*

Be it known that I, FRANK MAURICE BUD-LONG, a citizen of the United States, residing at San Jose, in the county of Santa Clara and State of California, have invented certain new and useful Improvements in Combined Centering and Facing Tools, of which the following is a specification.

My invention relates to a combined centering and facing tool, the object being to provide a tool adapted to be secured within the tailstock, spindle, or the like of a lathe or other metal or woodworking machine and with which any inexperienced person or novice may accurately drill a hole in the exact axial center of a shaft or similar body and also face the end of the same body without removing it from the tool.

In the accompanying drawings, Figure 1 is a side view of my improved tool, reduced in size, showing the center operation on the end portion of a shaft. Fig. 2 is a perspective view of the spring collet, and Fig. 3 a similar view of the facing cutter, used in this tool. Fig. 4 is a transverse section on line 4—4, Fig. 1, but showing the facing cutter in working position in full lines, and raised in dotted lines. Fig. 5 is a longitudinal section and plan view, showing the facing operation on a piece of centered stock.

The tool comprises a cylindrical body 2 having a pair of round openings 3 and 4, respectively, of different diameters at opposite ends of the body but with coincident axes. Body 2 is also open transversely approximately half its diameter midway of its ends, and has a flaring opening 6 radially opposite said middle opening 5 through which the cuttings may be discharged. The smaller end opening 4 adapted to receive the round end 7 of a holder for the center-drill 8, and a set screw 9 secures body 2 rigidly to said holder which embodies a tapering shank 10 designed to support the tool in a tailstock, or spindle of a lathe or other machine. A collar 11 on the base of shank 10 affords a backing or stop for body 2, and the center drill 8 projects into the middle open portion of the body and is in plain view. This center-drill may be a separate member inset into the end of the holder, or it may be made integral therewith, and the work to be drilled by this center-drill is introduced through a centering collet 12 which is removably seated and clamped by a set screw 13 within the larger opening 3 in the front and larger end of the body. A slotted and split spring collet may be used as shown to hold and center the work in true axial alinement with the center-drill 8, and collets having various sized central passages may be used according to the size or shape of the work. The collet bears against an inner shoulder 14 (see Fig. 1) when inserted into opening 3, and the inner transverse face of the collet is then substantially flush with the flat transverse face or wall 15 of the body. A cutter bar 16 extends across the tool adjacent collet 12 with the ends thereof fitting snugly within notches 17 in the sides of the body at the base of wall 15, and one end of this bar is pivoted at 18 to permit it to be turned up out of the way of the work during center-drilling operations. When the bar is lowered and seated in the notches, the cutting edge 19 extends radially outward from the axis of the tool and the inner end of the work may be faced off by the cutter bar.

In an operation where the work revolves, the work is chucked, and the tool placed in the tailstock or other head of the machine and fed over the end of the work until a center hole of the desired depth is drilled in the end of the work. The cutter bar is raised during this operation, but when the head carrying the tool is fed back far enough the cutter bar is lowered to its seat and the head fed forward again to face off the end of the work. However, the tool may be used in a machine having a revolving spindle or head, and the work held stationary.

The tool is of simple construction and takes the place of expensive centering machines now in use, and the centering operation is as quickly obtained with this tool as in any machine especially built for centering stock material. The collet and center-drill being held in one frame or body, absolute accuracy in centering operations is assured, even where the tool is being handled by a novice, and a large saving in labor cost is possible on this account, especially in shops where centering operations must be effected in lathes and other machines in general use in such places.

The so-called opening in body 2 between the respective end portions thereof having the respective differential openings or bores for the center-drill holder and the collet, respectively, is most clearly seen in Fig. 1, and which shows a reduction of one half said body as between the two ends thereof, and Fig. 5 shows a look into the interior of the stock or wall that remains between said ends and which shows something of a well with a flaring opening 6 in its bottom. This construction is also outlined in Fig. 4 and also shows clearly how the facing cutter-bar is pivoted and supported for operation within said space and adapted to work immediately next to the inner face of the collet. Otherwise said bar is raised out of the way somewhat as seen in dotted lines Fig. 4.

What I claim is:

1. A centering and facing tool comprising a body and a facing cutter pivoted thereon, and a collet and center-drill removably mounted in axial alinement within said body adjacent said facing cutter.

2. A tool having a body with axially alined openings of different diameters and open transversely at its middle, a swinging cutter bar at the middle opening, a center-drill having a shank secured in the smaller of the alined openings and a collet secured in the larger alined opening.

3. A tool for centering and facing operations, comprising a body having differential bores for the work and the holder for the center-drill respectively, a facing cutter pivoted to swing in a plane at right angles to the axis of said center-drill between said bores and a center-drill mounted in the smaller of said bores.

4. A centering and facing tool comprising a body and an operating member to which said body is fixed carrying a center-drill, a centering work holder removably mounted in said body axially opposite said holder and a facing cutter pivoted at one side on said body and adapted to swing across the face of said work holder.

Signed at San Jose, in the county of Santa Clara, and State of California, this 24th day of March, 1917.

FRANK MAURICE BUDLONG.

Witnesses:
M. E. PAGE,
EVA E. LYON.